Dec. 25, 1962     J. W. MACPHERSON, SR     3,070,236
CAKE SUPPORT
Filed March 23, 1960
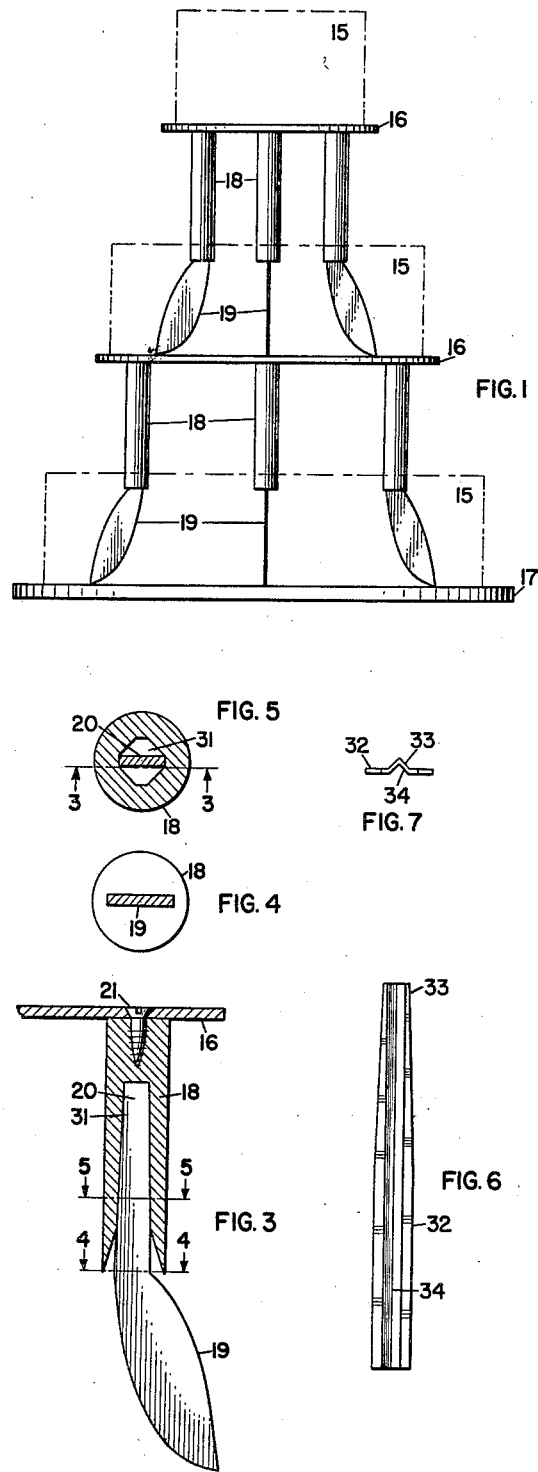
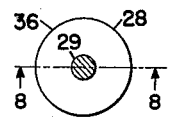
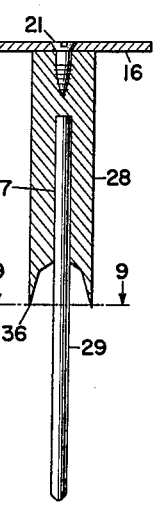
INVENTOR

United States Patent Office 3,070,236
Patented Dec. 25, 1962

3,070,236
CAKE SUPPORT
John W. MacPherson, Sr., Tacoma, Wash.
Filed Mar. 23, 1960, Ser. No. 17,225
4 Claims. (Cl. 211—137)

My invention relates to platform supporting devices in general and to cake supporting devices in particular.

A general object of my invention is improvement in methods of elevating tiers of cake one above another for the making of open-tier cakes for wedding parties and other occasions and for display purposes.

Particular objects of my invention are: the reduction of both time and skill required to make open-tier cakes; stability enough to handle and transport assembled open-tier cakes without the danger of them tipping over; simplicity and ease in serving such cakes; self-leveling platform units; the allowance for quick change of height of support units; easily cleaned support units; few or no loose parts for either the decorator or hostess to manage; support units which can be attached to any suitable plate; platform units which can be used in combination with other plates and platforms; modest cost by use of simple and few parts; the elimination of plates which rest on the top surface of cake tiers; the elimination of connections or fastenings between platform units; and the enhancement of beauty of appearance of cake by the allowance of properly proportioned and positioned pillars. Other objects and advantages are explained in the ensuing description.

FIG. 1 is an elevation showing the invention assembled with associated parts and with three tiers of cake, the latter shown in phantom. This illustrates four support units per plate 16, two of the support units being in line and showing only as one.

FIG. 2 is a plan view of horizontal plate 16 with circumference of cake shown in phantom.

FIG. 3 is a vertical section of the invention attached to horizontal plate 16, section taken on line 3—3 of FIG. 5.

FIG. 4 is a horizontal section taken on line 4—4 of FIG. 3.

FIG. 5 is a horizontal section taken on line 5—5 of FIG. 3.

FIG. 6 is an elevation of a straight penetrating leg.

FIG. 7 is a plan view of straight leg in FIG. 6.

FIG. 8 is a vertical section showing a third method of embodying the invention, section taken on line 8—8 of FIG. 9.

FIG. 9 is a horizontal section taken on line 9—9 of FIG. 8.

FIGS. 3, 6, and 8 are drawn to twice the scale of FIGS. 1 and 2. FIGS. 4, 5, 7, and 9 are drawn to three times the scale of FIGS. 1 and 2.

The invention consists primarily of two parts, the penetrating pillar 18 and the penetrating leg 19. The two parts together I will call a support unit. FIG. 3 shows a support unit attached to plate 16 by screw 21. The support units are used in conjunction with a suitable horizontal plate 16, three or more support units being firmly attached to the underside of plate 16 by screws 21 so as to be fixed in an upright position, and so as to be approximately equidistant from the center of plate 16 and from each other as shown by the four screw holes 14 in the round plate 16 in FIG. 2. One plate 16 with three or more support units thusly attached I will call a platform unit, two of which are illustrated in FIG. 1 with a platform unit of smaller diameter resting on top of a platform unit of larger diameter which in turn rests on a suitable plate 17 of larger diameter yet. The three tiers of cake 15 are shown in phantom in FIG. 1 resting upon the plates 16 and 17, the cake-pentrating legs 19 being immersed in their respective tiers 15 along with the lower ends of the cake-penetrating pillars 18. The plates 16 and 17 along with their respective tiers of cake 15 are round as is indicated in FIG. 2, but the support units may be used with plates and tiers of cake of any desired shape. Accordingly, the relative diameters of the plates 16 and 17 with their respective tiers 15 need not necessarily be positioned or proportioned in the pyramidal fashion shown in FIG. 1, and a cake may have more or less numbers of tiers 15 than what is shown in FIG. 1.

The purpose and function of the penetrating pillar 18 and the penetrating leg 19 are best described by starting with the making of an open-tier cake using the platform units as already described. First, the tiers of cake 15 to correspond in size and shape with the plates 16 and 17 are made in the usual manner and placed on their respective plates 16 and 17, the plates having been previously assembled with the support units to make platform units. Then without obstructions of any kind the tiers 15 are iced and are decorated to any desired stage of completeness. The cake is then assembled, preferably starting with the bottom-most platform unit first, by centering each tier-15-bearing platform unit over the preceding or lower tier 15 and lowering it into tier 15 until the legs 19 come to rest on plate 16 or 17 beneath. Thus the legs 19 and the lower parts of the pillars 18 are penetrated straight down into the tiers of cake 15, and the pillars now appear as if they rose from the bottom of the tiers 15. The platform units are automatically level.

A novel function of the pillar 18, i.e. in addition to supporting and beautifying, is to penetrate the surface of tier 15 easily and neatly and to a considerable depth if necessary. This is a very useful feature, for it allows much tolerance in the height of tier 15 above the bottom of pillar 18. The lower portion of the round pillar 18 is hollow and open-ended and tapers on the inside down to a thin if not sharp edge all around the bottom as shown in FIG. 3. The leg 19 is fixed in the middle of this hollow area but does not interfere with clean penetration. As the pillar 18 is lowered into tier 15 it cuts for itself a clean hole at the surface, including icing, and allows the pillar 18 to go farther into tier 15, compressing a column of cake 15 under pillar 18, without disturbing neatness of entrance hole.

The function of the leg 19, in addition to providing support, is to provide increased stability to the platform unit by two unique means: by the broadness or blade-like nature of the leg 19, and by the off-set nature of leg 19 increasing the radius of support. The broadness or blade-like nature of leg 19 not only prevents the legs 19 from sliding or tearing through the cake 15 but also prevents or tends to prevent the platform unit from tipping when subjected to a tipping force, and fortunately this stability increases as the diameter of plate 16 decreases and in many cases more than makes up for the stability lost by the decrease of radius of support. The stability gained by off-setting or extending the bottom end of leg 19 outward from the center of plate 16 is a novel way of increasing the radius of support without decreasing appearance value by locating the pillars 18 too close to the edge of plate 16.

In the effect, the legs 19 secure the platform unit to the tier of cake 15 and the platform unit is held stable by the weight of tier 15. Many combinations of platform units and tiers of cake 15 similar to FIG. 1 are stable enough to be transported fully assembled with no danger of them tipping over even on steep hills. This stability is gained not at the sacrifice of other qualities such as beauty, simplicity, speed or economy. And while very tall cakes cannot be safely transported fully assembled it is easy and practical with the system to assemble the tier-15-bearing platform units after delivery.

The pillar 18 and the leg 19 are joined together by sliding the tapered shank 20 of leg 19 snugly into the corresponding tapered hole in pillar 18, thus allowing for quick and simple change of different height legs 19 while assuring rigidity and easy cleaning. Pillar 18 is made with a square tapered hole 31 having beveled corners and running longitudinally within the pillar 18 from near the bottom, upwards, to within a short space of the bottom end of the screw 21. FIG. 5 shows a cross section of the hole and FIG. 3 shows the longitudinal run of the hole. The tapered shank 20 is integral with the leg 19 and is flat or blade-like too inasmuch as the whole member is simply cut or stamped out of a flat, relatively thin sheet of metal. The tapered edges of shank 20 bear against the beveled corners of the tapered hole in pillar 18. The tapered hole is square not only for firm support of shank 20 but for automatic positioning of leg 19 in any one of four positions. The pillar 18 can be made of plastic by either the pressure injection moulding method or the compression moulding method. Of primary importance is beauty of appearance of pillar 18 and by using plastic, pleasing shapes of even complicated design can be made at nominal cost per part.

FIGS. 6 and 7 show a penetrating leg 32 which can be used in place of leg 19. Its blade-like nature and broadness are similar to leg 19 but instead of being off-set it runs straight up and down so as to rest on an area or point directly under pillar 18. When the extra stability of leg 19 is not needed the straight leg of FIG. 6 is an advantage, for unlike leg 19 it produces no slit at the surface of tier 15 that is not covered by pillar 18, and less strength and rigidity in all parts of the platform unit are required. FIG. 7 shows clearly the crimp 34, along vertical lines, that runs from top to bottom of the straight leg FIG. 6 for the purpose of strengthening it and allowing the use of thinner material. The upper portion 33 of straight leg FIG. 6 is tapered and otherwise prepared to fit snugly into the tapered hole in pillar 18 after the manner of shank 20. The leg of FIG. 6 can be cut or stamped from sheet or strip metal and crimped at 34.

The pillars 18 are attached to the plates 16 by means of flat head beveled edge self-tapping screws 21, screws 21 seating into the drilled and countersunk holes 14 in the plates 16 and screwing into the holes moulded or drilled into the top portion of pillars 18 and drawing pillars 18 tight and firm against the bottom surface of plates 16. Some plastics and other type materials would require pretapping and a different type screw. Strength is important at this point.

A second method of embodying the invention is illustrated in FIGS. 8 and 9. In some circumstances of making and using open-tier cakes the extra stability gained by the off-set nature and/or the blade-like nature of legs 19, 27, 24, and FIG. 6 is not needed, and in such cases this second method is an ideal cake-penetrating support unit. The pillar 28 is made, preferably, of plastic similarly to pillar 18, only in place of the square tapered hole is a straight sided round hole of smaller horizontal cross section made to receive snugly the round post-like leg 29. Leg 29 can be cut cheaply from steel rod and beveled around the lower end to make a blunt point. The lower portion of pillar 28 is hollow, open-ended, and on the inside tapers down to a cake-penetrating edge 36 as shown in FIG. 9, after the manner of pillar 18. Pillar 28 is attached to plate 16 in the same manner as is pillar 18. The leg 29 is quickly inserted into or removed from the hole 37 in pillar 28, thus allowing for fast change of different height legs 29. This second support unit is used in substantially the same manner as the one of FIG. 3, and in function the penetrating pillar 28 is substantially similar to pillar 18, but the penetrating leg 29 does not increase the stability of the platform unit as do legs 19 and 32. The legs 19, 29 and 32 should be tin plated or galvanized, if made of steel, to prevent rusting. Plates 16 can be cut from sheet metal.

Open-tier cakes made using this invention can be served a tier 15 at a time starting at the top, and the tiers 15 can be cut and served from the plates 16 with the platform units in place without the danger of them tipping over. When a tier 15 is all served the empty platform unit is drawn out of the lower tier 15 which is then ready to serve without obstructions and is still beautifully decorated.

An advantage of my invention is that the support units can be attached to any suitable plate 16 by only drilling holes for the screws 21 or 26, thus allowing the individual decorator to use special shaped or sized plates locally made or homemade.

Be it understood that the improvements in cake supports I here present can be embodied in a variety of ways other than that which is shown here without necessarily contributing anything new or improved to the art over this invention.

I claim as my invention:

1. In a cake support having a horizontal plate, a plurality of upright support units each combining, a pillar with an upper end and a lower portion, the said lower portion hollow and downwardly open, a blade-like leg of substantially small horizontal cross-sectional area extending diagonally downward from the pillar in fixed relation thereto, the broad surface areas of said leg in vertical planes, and means for rigidly attaching the upper ends of the pillars to the underside of said plate approximately equidistant from the center of said plate and approximately equidistant from each other.

2. In a cake support having a horizontal plate, a plurality of upright support units each combining, a pillar with an upper end and a lower portion, the said lower portion hollow and downwardly open, a blade-like leg of substantially small horizontal cross-sectional area extending straight downward from the pillar in fixed relation thereto, and means for rigidly attaching the upper ends of the pillars to the underside of said plate approximately equidistant from the center of said plate and approximately equidistant from each other.

3. In a cake support having a horizontal plate, a plurality of upright support units each combining, a pillar with an upper end and middle and lower portions, said middle and lower portions hollow and downwardly open, a blade-like leg of substantially small horizontal cross-sectional area extending downward from the pillar and provided with a shank extending upward and fitting against the interior sides of said middle and lower portions to maintain the pillar and the leg in fixed disconnectable relation, and means for rigidly attaching the upper ends of the pillars to the underside of said plate approximately equidistant from the center of said plate and approximately equidistant from each other.

4. In a cake support having a horizontal plate, a plurality of upright support units each combining, a pillar with an upper end and middle and lower portions, said middle portion hollow cored and downwardly open, said lower portion hollow and downwardly open, a rod-like leg of substantially small horizontal cross-sectional area extending vertically downward from pillar and extending vertically upward and fitting into the hollow core of said middle section to maintain the pillar and the leg in fixed relationship, and means for rigidly attaching the upper ends of the pillars to the underside of said plate approximately equidistant from the center of said plate and approximately equidistant from each other.

References Cited in the file of this patent

UNITED STATES PATENTS

| | | |
|---|---|---|
| 135,696 | Dakin | Feb. 11, 1873 |
| 1,619,818 | Gowans | Mar. 8, 1927 |
| 2,178,166 | Enstrom | Oct. 31, 1939 |
| 2,921,691 | Dembinski | Jan. 19, 1960 |